US011755032B2

(12) United States Patent
Bodenheimer et al.

(10) Patent No.: US 11,755,032 B2
(45) Date of Patent: Sep. 12, 2023

(54) METHOD FOR DETECTING A ROAD CLASS (71) Applicant: Continental Teves AG & Co. oHG, Frankfurt (DE)

(72) Inventors: Robert Bodenheimer, Idstein (DE); Bernd Kubina, Eschborn (DE); Roland Burghardt, Frankfurt am Main (DE)

(73) Assignee: Continental Teves AG & Co. OHG, Frankfurt (DE)

(*) Notice: Subject to any disclaimer, the term of this patent is extended or adjusted under 35 U.S.C. 154(b) by 362 days.

(21) Appl. No.: 16/898,742

(22) Filed: Jun. 11, 2020

(65) Prior Publication Data
US 2020/0393848 A1 Dec. 17, 2020

(30) Foreign Application Priority Data

Jun. 12, 2019 (DE) ...................... 10 2019 208 533.4

(51) Int. Cl.
*G05D 1/02* (2020.01)
*G01C 21/30* (2006.01)
*G05D 1/00* (2006.01)

(52) U.S. Cl.
CPC ........... *G05D 1/0278* (2013.01); *G01C 21/30* (2013.01); *G05D 1/0088* (2013.01)

(58) Field of Classification Search
CPC ..... G05D 1/0278; G05D 1/0088; G01C 21/30
See application file for complete search history.

(56) References Cited

U.S. PATENT DOCUMENTS

| 7,676,325 B2 * | 3/2010 | Fujita ................. G01C 21/3826 701/523 |
| 11,340,080 B2 * | 5/2022 | Averilla ................. G06T 17/05 |
| 2011/0118979 A1 | 5/2011 | Mao et al. |

(Continued)

FOREIGN PATENT DOCUMENTS

| CN | 104567885 A * | 4/2015 | ............. G01C 21/30 |
| DE | 102012016802 A1 | 2/2014 | |

(Continued)

OTHER PUBLICATIONS

German Search Report dated Jan. 16, 2020 for corresponding German Patent Application No. 10 2019 208 533.4.

*Primary Examiner* — Aniss Chad
*Assistant Examiner* — Christine Nguyen Huynh (57) ABSTRACT The disclosure relates to a method and a corresponding execution device. The method includes determining a position of a vehicle by a satellite navigation system, establishing a guaranteed position range, where the guaranteed position range describes the geographical region around the actual position of the vehicle, in which the determined position has to be located according to a specified minimum integrity, matching the determined position with an electronically stored road map and corresponding allocation of the position of the vehicle to a road on the road map, where the road map includes information regarding open spaces without a drivable infrastructure as well as an allocation of roads according to road classes, and validating the road class of the allocated road according to the road map on the basis of the guaranteed position range as well as the information contained in the road map regarding open spaces without a drivable infrastructure.

17 Claims, 4 Drawing Sheets

(56) References Cited

U.S. PATENT DOCUMENTS

| | | | |
|---|---|---|---|
| 2013/0211656 A1* | 8/2013 | An | B62D 15/027 |
| | | | 701/25 |
| 2017/0122766 A1 | 4/2017 | Philip et al. | |
| 2017/0305420 A1 | 10/2017 | Desens et al. | |
| 2018/0024562 A1* | 1/2018 | Bellaiche | G05D 1/0088 |
| | | | 701/26 |
| 2018/0120844 A1* | 5/2018 | Okamoto | G08G 1/096716 |
| 2019/0037807 A1 | 12/2019 | Iagnemma et al. | |
| 2020/0393829 A1* | 12/2020 | O'Boyle | G06V 20/588 |

FOREIGN PATENT DOCUMENTS

| | | | |
|---|---|---|---|
| DE | 102016212146 A1 * | 1/2018 | |
| DE | 102018004229 A1 | 11/2019 | |

\* cited by examiner

METHOD FOR DETECTING A ROAD CLASS

CROSS-REFERENCE TO RELATED APPLICATIONS

This application claims the benefit to German Patent Application No. DE 10 2019 208 533.4, filed Jun. 12, 2019. The disclosures of the above applications are incorporated herein by reference.

TECHNICAL FIELD

The disclosure relates to a method for detecting a road class, an execution device for performing the method and a corresponding computer program product.

BACKGROUND

During positioning with satellites, four unknowns have to be determined—the coordinates in the three spatial directions and the time deviation between the satellite and the receiver. However, if more than four satellite signals are available, the additional signals may be used to validate the measurement. In order to be able to allocate an integrity level, that is to say a specific trustworthiness, to a specific captured position, all of the residual errors which can be expected or respectively are possible are established or calculated so that information regarding the measuring inaccuracy is obtained. Methods which use this principle can be summarized by the generic term RAIM (Receiver Autonomous Integrity Monitoring). The determined measuring inaccuracy can then be translated into a guaranteed position range which describes the geographical region around the vehicle, in which the actual position of the vehicle has to be located with a certain degree of certainty according to the measurement, taking into account the measuring inaccuracy.

In the case of vehicles which are able to change from a driver-controlled or partially driver-controlled driving mode to a fully autonomous driving mode, it should be noted that this transfer from a human to the driving computer must not result in safety-critical situations, for example because the road which is currently being driven on is not suitable or at least not permitted for the autonomous driving mode or because the present situation on the road is not suitable for initializing the autonomous driving mode. Therefore, it makes sense to make the ability to activate the vehicle function dependent on the vehicle position.

In order to ensure that no safety-critical situations ensue, it would thus be helpful to be able to carry out particularly reliable localization of the vehicle. However, conventional satellite navigation and RAIM technology for ascertaining the integrity level are not always sufficiently precise and reliable. In particular, by applying the high requirements of an ASIL classification, the guaranteed position range becomes so large that it lies in the one-to-double-digit meter region and it is no longer possible to unequivocally allocate the vehicle position to a road. Thus, it is no longer possible, for example, to reliably detect whether the vehicle is located on a specific road, as it could also be located on a neighboring road beside it, above (bridge) or below (underpass). The increase in the guaranteed position range can be attributed to the fact that the required level of reliability is higher. The region in which the actual position of the vehicle has to be located accordingly extends further than previously, in order to be able to satisfy this requirement.

SUMMARY

The disclosure provides a method for detecting a road class which also satisfies a high level of reliability or respectively meets the high integrity requirements. Initially, it may appear promising to attempt to solve the problem with the aid of elaborate technology to reduce the guaranteed position range, that is to say to lower the probability of error. However, the method according to the disclosure pursues a different approach which allows a considerably less elaborate implementation.

One aspect of the disclosure provides a method for detecting a road class. The method includes determining the position of the vehicle by a satellite navigation system (GNSS). This can, for example, be GPS, GLONASS, Galileo or BeiDou. Additionally, the positioning may be refined in the known way, for example, by odometry and/or inertial sensor technology.

Furthermore, the method includes establishing a guaranteed position range, where the guaranteed position range describes the geographical region around the actual position of the vehicle, in which the determined position has to be located according to a specified minimum integrity. The term "guaranteed position range", which can equally be referred to as a protection limit, may also be equated with the radius or average radius of the region or respectively may be understood in this way. The guaranteed position range is based on a minimum integrity, that is to say a level of reliability which is predefined for example by a specific ASIL grading.

Implementations of the disclosure may include one or more of the following optional features. In some implementations, the method also includes matching the determined position with an electronically stored road map and a corresponding allocation of the determined position of the vehicle to a road on the road map. An electronically stored road map is, for example, a digital data record which, in the case of a vector map, images lines connected to dots, which correspond to the road network with the road courses, which may also include height indications.

In addition, the road map may include information regarding open spaces without a drivable infrastructure, hereinafter also partially referred to as an open area. Accordingly, a region which represents no such open space is hereinafter referred to as a drivable infrastructure, even if is not absolutely ensured whether this region really is open to traffic and to which vehicles. Open spaces without a drivable infrastructure may all be geographical regions which cannot be immediately driven by a land vehicle or respectively in particular with a road vehicle or can only be driven with a certain effort, for example because there is/are a house, trees, a river or only air at this location. It should be noted that the information regarding open spaces without a drivable infrastructure exists as guaranteed and immediately retrievable data, that is to say it does not (as might possibly be the case with conventional maps) have to first be extracted from the map as the part of a map, which is not marked as a road. Since open spaces without a drivable infrastructure are subject to changes over longer periods, for example as a result of construction measures, the road map may be constantly kept up-to-date in order to be able to comply with the required integrity level regarding the data as well.

Moreover, the map includes an allocation of roads according to road classes or respectively road categories. Roads can be categorized, for example, according to federal highways, federal roads, state roads, district roads and municipal roads, however the roads may be categorized according to criteria which are primarily important for autonomous driving, e.g. whether a structural separation from the opposite carriageway is present or what the condition of the road is.

In addition, the method includes validating the road class of the allocated road according to the road map on the basis of the guaranteed position range as well as the information contained in the road map regarding open spaces without a drivable infrastructure. The guaranteed position range may be projected centrally onto the determined vehicle position and it is monitored to what extent the guaranteed position range wholly or partially intersects the road, open spaces without a drivable infrastructure, and/or regions outside the open spaces.

Thanks to the supplementing according to the disclosure of the roads marked on the map by lateral free space information, it is possible, despite a large guaranteed position range, to gain a guaranteed insight of which road and, therefore, which road class the vehicle is located on.

If the guaranteed position range includes, at a specific time, for example both the road currently allocated to the vehicle position and a region which is not identified as an infrastructure which cannot be driven, that is to say it is identified as a potentially drivable infrastructure, it can be concluded that the current road class has not been recognized with certainty at this time, because it is not clear whether the vehicle is, for example, located on a road running parallel with respect to the actually allocated road or an intersecting road or respectively an underpass or an overpass. Instead, in this case, only a later point in time can provide this knowledge. If, however, the map region covered by the guaranteed position range only contains the road currently allocated to the vehicle position and no region identified as a drivable infrastructure, it can be reliably assumed that the vehicle is really located on this road and the corresponding road class applies.

Depending on whether a road class has been reliably established, that is to say positively validated, with the method according to the disclosure, an activation of an autonomous driving mode or an activation of other vehicle functions may be enabled depending on the permissibility saved for this road class. If the guaranteed position range is completely outside a region permitted for the activation, an activation is prevented from taking place. If the guaranteed position range is neither completely in the region of the road and the neighboring open area, nor completely outside, the result of the validation may be evaluated as an intermediate condition, in which the road class cannot be unequivocally established or excluded. In this case, it is preferable that the vehicle function cannot be activated. However, it is not essential either that it has to be deactivated if it is currently active.

In some examples, the road class is positively validated, provided that the guaranteed position range on the road map exclusively overlaps with the road or with the road and an open space without a drivable infrastructure.

In addition, in some examples, the road class is negatively validated, provided that the guaranteed position range on the road map does not overlap or only partially overlaps with the road.

In some implementations, in the event of a positive validation, an activation of a vehicle function, for examples, of an autonomous driving mode, is enabled, provided that the vehicle function has previously been enabled for the validated road class. The term "autonomous or respectively automated driving mode" is understood to mean that the vehicle completely or at least partially assumes control of the vehicle, for example steering, indicating, acceleration and braking maneuvers longitudinally and transversely to the lane without human intervention. For example, different automation levels or respectively generally different vehicle functions may be permitted for different road classes, and the guaranteed position range may also be different for these.

In some examples, the information regarding open spaces includes details regarding up to what distance perpendicular to the allocated road and for what length parallel to the course of the road there is no drivable infrastructure. The information regarding open spaces therefore relates to the surrounding region of the respective road.

For the end portions of an open spatial region which adjoins another open spatial region, it makes sense if the narrower region prevails for safety. Therefore, the length of the guaranteed position range measured parallel to the allocated road, the smallest distance perpendicular to the allocated road may be significant for validating the road class. The end portions therefore correspond to the length of the guaranteed position range, or respectively its radius, provided that the guaranteed position range is circular.

In some implementations, access roads and exits are marked on the road map, where the validation of the road class is performed precisely once between access roads and/or exits. The condition that applies to this is that it must be a road having a structural separation between the roadways. Since it should not be possible for the vehicle to change road between two exits which could be used to leave the road, it can be assumed that the road class, once it has been validated, remains in force. The computational cost can be kept within reasonable limits by ensuring that the method is only performed once.

In some examples, the guaranteed position range includes a guaranteed horizontal position range and a guaranteed vertical position range. The horizontal direction corresponds to the Earth's surface, neglecting its curvature, and the vertical direction corresponds to the direction perpendicular thereto or respectively corresponds to the vertical axis of the vehicle. In other words, the guaranteed position range is spatially formed, for example, separately for a vertical and for a horizontal direction. Accordingly, the road map may include information regarding open spaces without a drivable infrastructure, both in a horizontal and in a vertical direction, where the validation is effected both in the horizontal and in the vertical direction. The advantage of this is that not only are neighboring roads at the same level considered, but also roads located thereabove or thereunder such as, for example, in the case of a highway intersection or in the case of bridges or tunnels.

In some examples, in a surrounding area around the position of the vehicle that can be captured by vehicle sensor technology, the information regarding open spaces without a drivable infrastructure contained in the road map is validated by the vehicle sensor technology, such as, a camera, radar, and/or lidar. Such vehicle sensor technology is frequently available anyway in the case of vehicles which can be operated autonomously. It can be utilized, in this case, to ensure that the map information is up-to-date or respectively to keep the map up-to-date.

In some examples, the information regarding open spaces without a drivable infrastructure in the road map is modeled as cuboidal bodies surrounding the road. Accordingly, in the case of a purely two-dimensional observation, the information regarding open spaces without a drivable infrastructure may be modeled as rectangles in the road map. This reduces the data volume. Alternatively, the open spaces without a drivable infrastructure may also be approximated with other forms or modeled in complete details.

In some implementations, the guaranteed position range describes a cylindrical space or a cylindrical space having an oval base. This is produced by merging the horizontal and the vertical guaranteed position range. In this case, the vertical guaranteed position range extends from the vehicle which is modeled as a point downwards and upwards in each case with half the cylinder height.

In some examples, a GNSS antenna and/or odometry and/or inertial sensor technology of the vehicle is/are used in order to determine the position of the vehicle. The various measurement values may be merged into improved position information by a suitable fusion filter.

According to another aspect of the disclosure, an execution device has a memory and a processor, where one of the indicated methods is saved in the memory in the form of a computer program, and the processor is configured to execute the method if the computer program is loaded from the memory into the processor.

In some examples, the computer program includes program coding means in order to perform all the steps of the method if the computer program is run on a computer or the execution device.

In accordance with another aspect of the disclosure, a computer program product includes a program code which is stored on a computer-readable data carrier and which, if it is run on a data processing apparatus, performs one of the indicated methods.

The details of one or more implementations of the disclosure are set forth in the accompanying drawings and the description below. Other aspects, features, and advantages will be apparent from the description and drawings, and from the claims.

DESCRIPTION OF DRAWINGS

Like reference symbols in the various drawings indicate like elements.

DETAILED DESCRIPTION

Figure 1:
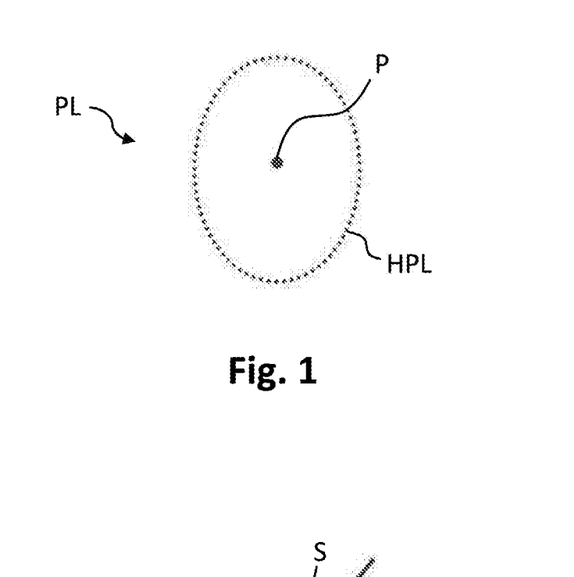
FIG. 1 shows a representation of a horizontal guaranteed position range.

A position P of a vehicle determined with a specific certainty is represented as a point in FIG. 1. The determination of the position P is carried out in this example on the basis of satellite signals of a global navigation satellite system, also referred to as GNSS. A calculation of possible errors and, therefore, an evaluation of the integrity or respectively measuring inaccuracy of the position determination, which may be represented as a circle or, as in FIG. 1, as an ellipse around the determined position P, is effected by Receiver Autonomous Integrity Monitoring (RAIM). This representation of the measuring inaccuracy is also referred to as a protection limit or as a guaranteed position range PL, since the geographical region around the actual position of the vehicle, in which the determined position P has to be located according to a specified minimum integrity, is described therewith.

When using RAIM, the following applies in general: as the integrity requirement increases, that is to say increased requirements are imposed on the level of reliability, the size of the guaranteed position range PL also increases, since the possibility that the real position of the vehicle lies outside the guaranteed position range PL has to be capable of being excluded with even greater certainty.

This guaranteed position range PL may be transferred along with the determined position P of the vehicle to a road S on a virtual or respectively electronically stored road map. Such a map may be used for detecting road classes, without being reliant on imaging sensors for autonomous driving. For this purpose, regions are defined by geocoordinates in which a specific driving function is to be capable of being activated, which is also known by the term "geo-fencing". If the receiver is within a defined region, a specific function is or can be activated. If the receiver is outside or leaves the region, the function is deactivated or respectively can no longer be activated.

In order to be able to operate safe geo-fencing with GNSS, levels of reliability in the ASIL region are necessary. As soon as the required integrity level reaches ASIL, the achievable radii of the guaranteed position ranges PL lie within the single-to-double-digit meter region. Therefore, a part of the measuring inaccuracy circumcircle is outside the driven road S and the system cannot confidently establish the road class, for example highway, because it cannot confidently be detected whether the vehicle is located on a specific road S or on a neighboring road. However, the method according to the disclosure does offer a solution to this problem.

Figure 2:
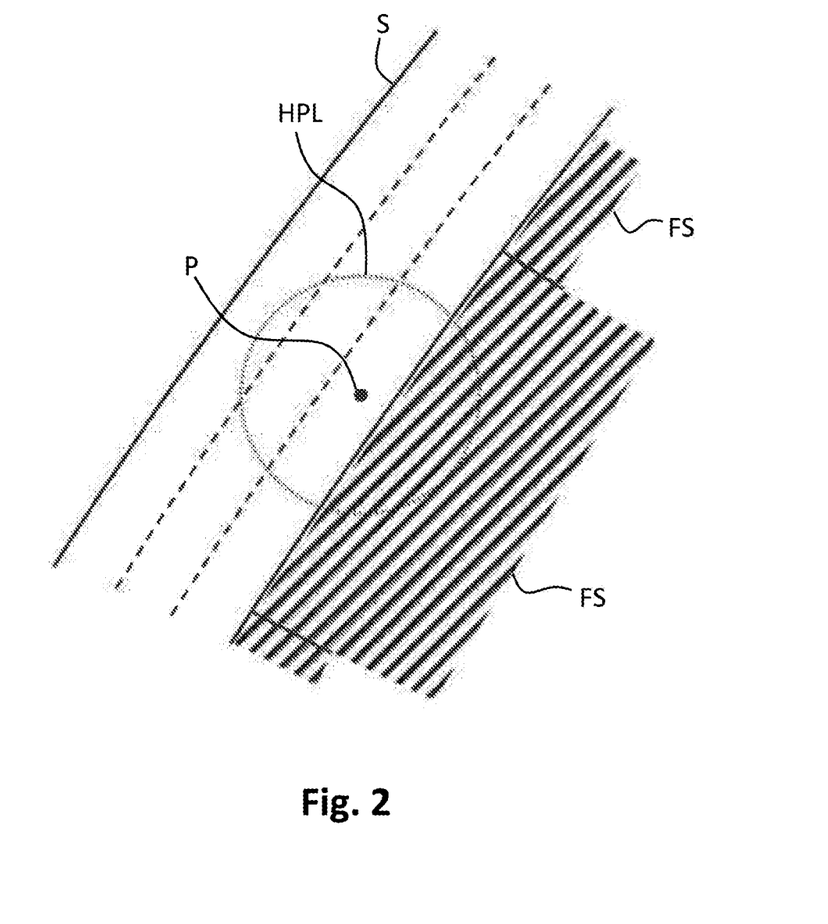
FIG. 2 shows a multi-lane road as well as open spaces without a drivable infrastructure, as saved in an electronically stored road map.

A corresponding map section having a multi-lane road S and the vehicle position P projected thereon is represented with the guaranteed position range PL in FIG. 2. A particular advantage is created by extending the map by two pieces of context information which also comply with the required integrity level. It is understood that the context information should accordingly be correct and should, for example, be regularly validated. The time interval in which a re-examination should take place can depend, for example, on the development potential of the areas surrounding the road S as well as the standard preparation time for the location and the implementation time. The first context information relates to access roads and exits E of a road S, the position of which is securely saved in the map. In addition to access roads and exits, these also include, for example, rest areas, emergency exits or similar. It may be useful to only use or take into account this context information for specific road classes, for example for roads having a structural separation which prevents a change of roads beyond the known access roads and exits E. The advantage of the first context information is that once a guaranteed, that is to say validated, road class allocation has been effected, this allocation can be retained without further examination up to the next access road or respectively exit E.

The second context information relates to the environment of the respective road S, both horizontally and vertically. As a general rule, conventional road maps do not claim to be complete with regard to the road network, in particular in terms of smaller or respectively non-public roads. Therefore, free space information, that is to say information regarding open spaces without a drivable infrastructure FS, is deposited in the map. Accordingly, the small, non-public roads are located outside these regions. The information regarding open spaces without a drivable infrastructure FS are represented in FIG. 2 as hatched areas. They provide information as to how many meters parallel to the road S to be detected are free, horizontally, of a drivable or at least a rapidly drivable infrastructure, and whether further drivable infrastructure such as bridges or underpasses are present above or below the road S to be detected, that is to say vertically.

Consequently, the road class may be confidently detected during the positioning by GNSS, even in the case of a large guaranteed position range PL, in that it is recognized based on the context information whether no other road class can be possible, even taking into account the entire guaranteed position range PL.

Figure 3:
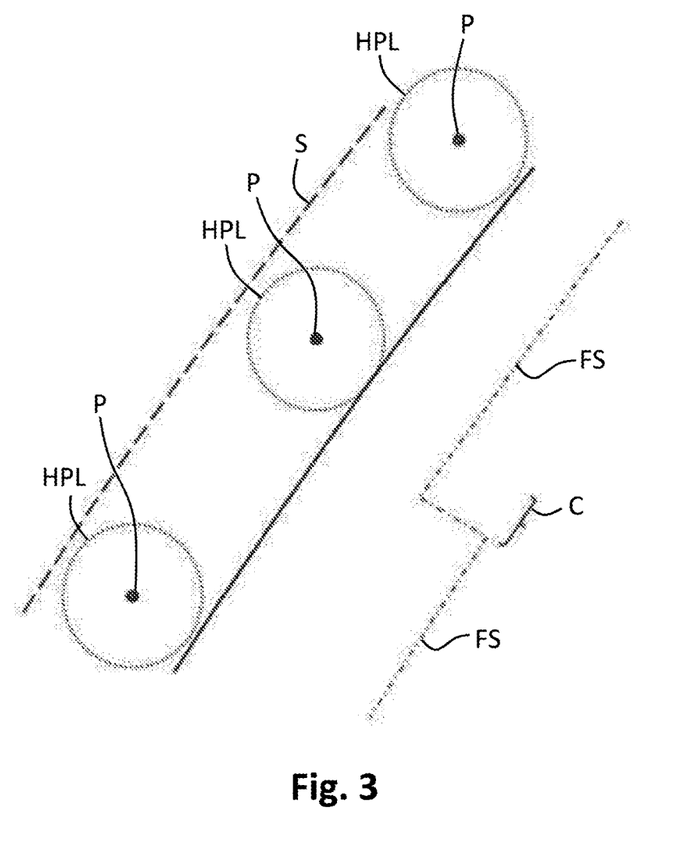
FIG. 3 shows a road as well as open spaces without a drivable infrastructure and three different vehicle positions.

The information regarding open spaces without a drivable infrastructure FS is produced in such a way that guaranteed positions are established on the road S to be allocated. For the region between two points, the smallest distance up to a (sufficiently rapidly) drivable infrastructure is indicated, both horizontally and vertically. At the start and end of a region, as represented in FIG. 3 for the middle of the three marked vehicle positions P, the smaller open area prevails in each case. The superimposition C corresponds in the horizontal and vertical directions to the extent of the guaranteed position range PL at the determined vehicle position P. Accordingly, the narrower of the two open areas is allocated to the middle vehicle position P, even if the wider open area would be present at this point according to the map.

Figure 4:
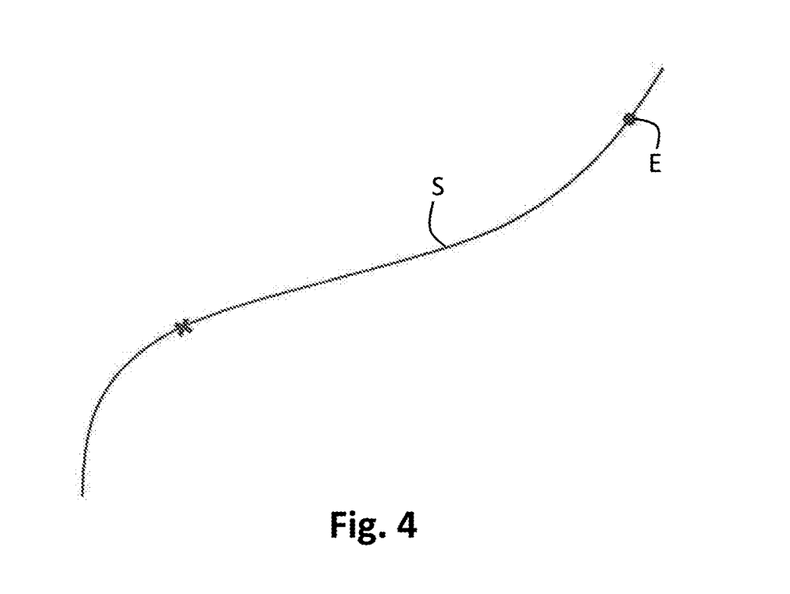
FIG. 4 shows a road with guaranteed information regarding a potential exit.

In FIG. 4, the road S is represented from greater distance or respectively as a line. The position at which a positively validated road class has been determined is marked with a cross; in addition, an access road or respectively exit E is represented as a point. Since, in this example, it is known of the road S that it contains a structural separation, it can be assumed up to the next possible access road or respectively exit E that the road class, once recognized, does not change.

Figure 5:
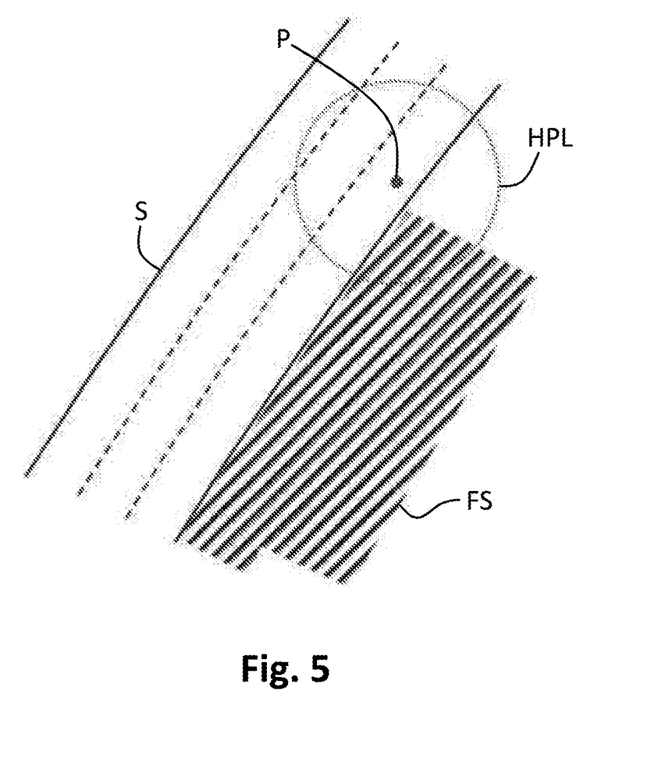
FIG. 5 shows a multi-lane road as well as an open space without a drivable infrastructure, as saved in an electronically stored road map.

If the determined position P is completely outside the region allowed for a specific driving function, for example a highway, then this driving function, provided it is only allowed for this region, is deactivated. However, FIG. 5 shows a case in which the situation is less clear. The guaranteed position range PL is neither completely in the region of the road S itself and the open area thereof, nor is it completely outside. In this intermediate condition, the road class cannot be unequivocally established or excluded. It should not be possible to activate a vehicle function which is only permitted for a specific road class in this case, but it does not necessarily have to be deactivated either if it is active at this time.

Figure 6:
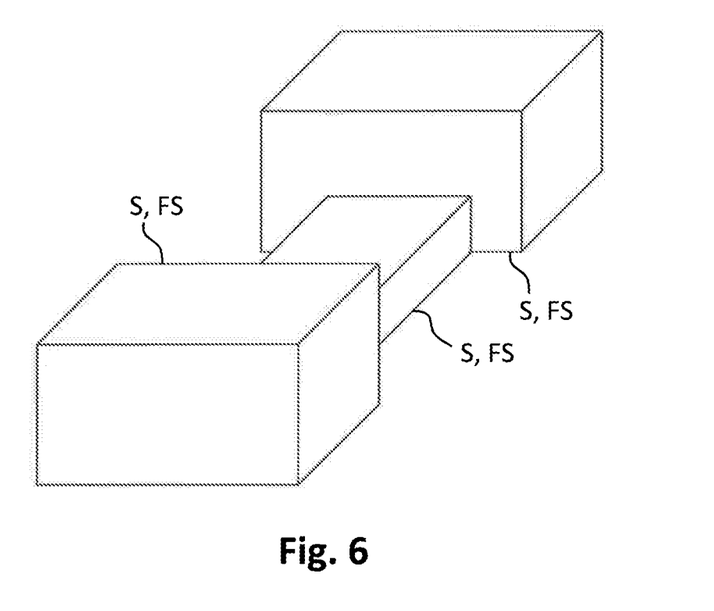
FIG. 6 shows a road together with open spaces without a drivable infrastructure, as saved in a three-dimensional manner in an electronically stored road map.

While FIGS. 1 to 5 are two-dimensional representations, FIG. 6 is intended to illustrate how a corresponding three-dimensional configuration of the information regarding open spaces without a drivable infrastructure FS is represented together with a road S in the map.

Figure 7:
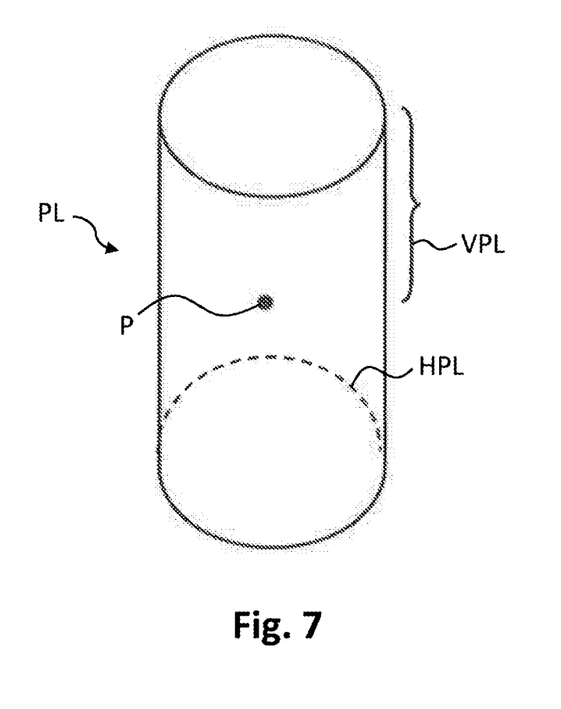
FIG. 7 shows a spatial representation of a guaranteed position range.

FIG. 7 shows the corresponding three-dimensional representation of the guaranteed position range PL. The horizontal surface of the guaranteed position range HPL, which is in this case circular, is accordingly extended upwards and downwards by a vertical guaranteed position range VPL.

With the aid of the information regarding open spaces without a drivable infrastructure FS, a probability for good mobile radio reception can, if necessary, additionally be correlated. This can in turn be utilized in order to buffer the required data in good time.

A number of implementations have been described. Nevertheless, it will be understood that various modifications may be made without departing from the spirit and scope of the disclosure. Accordingly, other implementations are within the scope of the following claims.

What is claimed is:

1. A method for detecting a road class, the method comprising:
determining a position of a vehicle by a satellite navigation system,
establishing a guaranteed position range, the guaranteed position range describes a geographical region around the actual position of the vehicle, in which the determined position has to be located according to a specified minimum integrity,
matching the determined position with an electronically stored road map and corresponding allocation of the position of the vehicle to a road on the road map, wherein the road map contains horizontal-free-space information regarding open spaces without a drivable infrastructure as well as an allocation of roads according to road classes, wherein the horizontal-free-space information, which is contained in the electronically stored road map, specifies up to what distance horizontally perpendicular to the allocated road, and for what length parallel to a course of the road, there is no drivable infrastructure, and
validating the road class of the allocated road according to the road map on the basis of the guaranteed position range as well as the horizontal-free-space information contained in the road map regarding open spaces without a drivable infrastructure, wherein, in the event of a positive validation, an automated-driving function of the vehicle is activated, wherein the automated-driving function includes the vehicle taking control, from the driver, of at least one of: steering, acceleration, and braking maneuvers.

2. The method according to claim 1, wherein the road class is positively validated, provided that the guaranteed position range on the road map exclusively overlaps with the road or with the road and an open space without a drivable infrastructure.

3. The method according to claim 1, wherein the road class is negatively validated, provided that the guaranteed position range on the road map does not overlap or only partially overlaps with the road.

4. The method according to claim 1, wherein, for a length of the guaranteed position range measured parallel to the allocated road, a smallest horizontal distance perpendicular to the allocated road is used for validating the road class.

5. The method according to claim 1, wherein access roads and exits are marked on the road map, and wherein the validation of the road class is performed precisely once between access roads and/or exits.

6. The method according to claim 1, wherein the guaranteed position range comprises a guaranteed horizontal position range and a guaranteed vertical position range, and the road map specifies open spaces without a drivable infrastructure both in a horizontal and in a vertical direction, wherein the validation is effected both in the horizontal and in the vertical direction.

7. The method according to claim 1, wherein in a surrounding area around the position of the vehicle that can be captured by vehicle sensor technology, the horizontal-free-space information regarding open spaces without a drivable infrastructure contained in the road map is validated by the vehicle sensor technology.

8. The method according to claim 7, wherein the vehicle sensor technology includes a camera, radar, and/or lidar.

9. The method according to claim 1, wherein the horizontal-free-space information regarding open spaces without a drivable infrastructure is modeled on the road map as cuboidal bodies surrounding the road.

10. The method according to claim 1, wherein the guaranteed position range describes a cylindrical space or a cylindrical space having an oval base.

11. The method according to claim 1, wherein a GNSS antenna and/or odometry and/or inertial sensor technology of the vehicle is/are used in order to determine the position of the vehicle.

12. The method for detecting a road class of claim 1, wherein
the horizontal-free-space information is contained in the electronically stored road map as directly retrievable data that does not have to be derived, in a subsequent step, from road map data that is first be extracted from the electronically stored road map as a part of the electronically stored road map that is not marked as a road.

13. An execution device having a memory and a processor, wherein a method for detecting a road class is saved in the memory in the form of a computer program and the processor is configured to execute the method if the computer program is loaded from the memory into the processor, the method comprising:
determining a position of a vehicle by a satellite navigation system,
establishing a guaranteed position range, the guaranteed position range describes a geographical region around the actual position of the vehicle, in which the determined position has to be located according to a specified minimum integrity,
matching the determined position with an electronically stored road map and corresponding allocation of the position of the vehicle to a road on the road map, wherein the road map contains horizontal-free-space information regarding open spaces without a drivable infrastructure as well as an allocation of roads according to road classes, wherein the horizontal-free-space information, which is contained in the electronically stored road map, specifies up to what distance horizontally perpendicular to the allocated road, and for what length parallel to a course of the road, there is no drivable infrastructure, and
validating the road class of the allocated road according to the road map on the basis of the guaranteed position range as well as the horizontal-free-space information contained in the road map regarding open spaces without a drivable infrastructure, wherein, in the event of a positive validation, an automated-driving function of the vehicle is activated, wherein the automated-driving function includes the vehicle taking control, from the driver, of at least one of: steering, acceleration, and braking maneuvers.

14. The execution device according to claim 13, wherein the computer program comprises program coding means in order to perform all the steps of the method if the computer program is run on a computer or the execution device.

15. The execution device according to claim 13, wherein the road class is positively validated, provided that the guaranteed position range on the road map exclusively overlaps with the road or with the road and an open space without a drivable infrastructure.

16. The execution device according to claim 13, wherein the road class is negatively validated, provided that the guaranteed position range on the road map does not overlap or only partially overlaps with the road.

17. The execution device of claim 13, wherein the horizontal-free-space information is contained in the electronically stored road map as directly retrievable data that does not have to be derived, in a subsequent step, from road map data that is first be extracted from the electronically stored road map as a part of the electronically stored road map that is not marked as a road.

* * * * *